(12) United States Patent
Medeiros et al.

(10) Patent No.: US 6,413,452 B1
(45) Date of Patent: Jul. 2, 2002

(54) METHOD OF MAKING SIZELESS YARN

(75) Inventors: Robert Walter Medeiros, Colonial Heights; Eugene James Corrigan, Chesterfield; Thomas Yiu-Tai Tam, Richmond; Elsaid Hassan Salem, Colonial Heights; Jiunn-Yow Chen, Chester; Michael James Reynolds; John Kenneth Yasnowsky, both of Richmond, all of VA (US)

(73) Assignee: AlliedSignal Inc., Morristown, NJ (US)

( * ) Notice: Subject to any disclaimer, the term of this patent is extended or adjusted under 35 U.S.C. 154(b) by 215 days.

(21) Appl. No.: 09/590,997

(22) Filed: Jun. 9, 2000

Related U.S. Application Data

(62) Division of application No. 09/271,941, filed on Mar. 18, 1999, now Pat. No. 6,099,963.

(51) Int. Cl.$^7$ .................. B29C 47/92; D01D 5/08; D01F 6/60; D02G 1/16
(52) U.S. Cl. .................. 264/40.1; 28/271; 73/160; 264/103; 264/211.14
(58) Field of Search .................. 264/40.1, 103, 264/211.14; 28/271; 73/160

(56) References Cited

U.S. PATENT DOCUMENTS

| 3,566,683 A | 3/1971 | Bulla et al. .................. 73/160 |
| 5,434,003 A | 7/1995 | Medeiros et al. ............ 428/399 |
| 5,518,814 A | 5/1996 | Bonigk ........................ 428/365 |
| 5,579,628 A | 12/1996 | Dunbar et al. ................. 57/246 |
| 5,657,798 A | 8/1997 | Krummheuer et al. ... 139/420 A |
| 5,705,817 A | 1/1998 | Louis et al. ............. 250/359.1 |
| 5,718,854 A | 2/1998 | Nguyen ...................... 264/40.1 |
| 5,836,532 A | 11/1998 | Thompson ............. 242/35.5 R |
| 5,881,776 A | 3/1999 | Beasley, Jr. ................. 139/389 |

FOREIGN PATENT DOCUMENTS

| DE | 43 24 752 A1 | 1/1995 |
| EP | 0 747267 A2 | 12/1996 |
| EP | 0 616 058 B1 | 7/1997 |
| WO | WO 92/01622 A1 | 2/1992 |

*Primary Examiner*—Leo B. Tentoni
(74) *Attorney, Agent, or Firm*—Melanie L. Brown; Virginia Szigeti; Roger H. Criss

(57) ABSTRACT

A yarn having good entanglement and good quality, preferably a multifilament polyamide yarn, a method for making the yarn, and a woven fabric made from the yarn wherein the yarn comprises the following properties: the yarn length per defect is greater than or equal to about 3000 meters per defect; the maximum skip length is less than or equal to about 120 millimeters; the ratio between yarn length per defect to maximum skip length is greater than or equal to about 50; the entanglements per meter times the average entanglement strength is greater than or equal to about 120; and the yarn can be woven sizeless. The yarn of the invention is useful in the sizeless weaving of fabric used in air bags.

5 Claims, 1 Drawing Sheet

METHOD OF MAKING SIZELESS YARN

This application is a divisional of application Ser. No. 09/271,941 Filed on Mar. 18, 1999, now U.S. Pat. No. 6,099,963. The entire disclosure of the prior application(s) is hereby incorporated by reference in its entirety.

BACKGROUND OF THE INVENTION

1. Field of the Invention

The invention relates to a synthetic material, multifilament yarn. More particularly, the invention relates to synthetic material, multifilament yarn having good entanglement and good yarn quality that can be woven sizeless. Also presented is a method to make the yarn and a method of using the yarn. The yarn of this invention may be used in the fabric used to make air bags.

2. Description of the Related Art

The yarn used in the fabric for air bags is typically polyamide, either nylon 6 or nylon 66, polyester, polypropylene or polyethylene. Desirable qualities for air bag fabrics include: excellent tensile and tear strengths, high toughness and mechanical fatigue properties, high thermal stability, and appropriate air permeability, In addition, the yarn used to weave air bag fabric must yield a high pick per inch to ensure appropriate air permeability. Processability of the yarn used in weaving is important because it affects the final properties and the cost of the resultant fabric. A common problem with multifilament synthetic yarns during high speed weaving is the development of stripbacks which are the result of broken filaments in the warp yarns balling up (creating defects that are identified in the industry as stripbacks, fuzzballs, slubs, etc.), which can result in breakouts due to the negative affect on the fill. Such breakouts reduce the efficiency of weaving and increase costs. To reduce such problems, methods to increase the cohesiveness of multifilament synthetic yarns have been typically pursued.

One method is to apply sizing to the yarn. Sizing is the procedure wherein the yarn is coated with a substance (e.g. polyacrylic acid, polyvinyl alcohol, polystyrene, polyacetates, wax, oil, gelatin, starch, etc.) to bind the filaments of the yarn together and to stiffen the yarn to provide abrasion resistance during weaving. The process of applying sizing is commonly called "slashing" in the industry. Abrasion reduction contributes to a reduction in the number of breaks, stripbacks, fuzzballs, etc. during the course of weaving. Such problems can significantly reduce productivity in the weaving process if encountered frequently. Disadvantageously, however, the use of sizing requires several extra steps in the fabrication process. In addition, it also involves extra cost to purchase sizing and to dispose of the removed sizing after weaving. The elimination of the need for the use of sizing would represent a significant improvement.

Another method for providing cohesion between the filaments is the use of what is known variously as entangling, mingling, commingling, or interlacing. The term "entangling" will be used herein for convenience but the other terms could just as easily be substituted therefor. Entangling is a process which forms a series of intermittent sections along the length of the yarn wherein the individual filaments are tightly entangled with each other. These entangled sections are known variously as entanglements, nips, nodes or knots and are separated from each other by lengths of filaments wherein the individual filaments are relatively parallel to each other. The entanglements act to prevent the individual filaments from spreading and splaying during processing of the yarn, thereby maintaining a cohesive yarn bundle. Entangling alone however is often not sufficient to provide a yarn which can be reliably woven sizeless for air bag fabrics and similar fabrics, using current weaving looms with the desired efficiency.

Entangled yarns are known in the art. Commonly-assigned U.S. Pat. No. 5,434,003 teaches a yarn having an entanglement strength of at least about 4.5, an entanglement strength coefficient of variance of less than about 1.10 and an average entanglement length for each entanglement of at least about 11.0 mm. The yarn has a knitting performance of at least 4,000 racks/defect. The yarn of this patent is intended for knitting, not for weaving. The patent is silent on the yarn quality. Commercially available entangled yarns include AlliedSignal's 1 R86 nylon 6 yarn and Akzo's 447HRT nylon 6 yarn.

Prior art teachings to produce a sizeless yarn are also known. U.S. Pat. No. 5,657,798 teaches a yarn having a mean opening length of from 2 to 10 cm, and the coefficient K1 for the stability of the intermingling points of the yarn exceeds 0.6 and the coefficient K2 for the stability of the intermingling points of the yarn exceeds 0.3. This patent is silent on the yarn quality. Other relevant teachings include U.S. Pat. No. 5,518,814. An on-line yarn quality detection device is taught for example in U.S. Pat. No. 5,718,854.

Therefore, there is no description in the prior art of yarn having both good entanglement and good yarn quality which can be woven sizeless, nor a process for producing such a desirable yarn.

SUMMARY OF THE INVENTION

We have developed a yarn which responds to the foregoing need in the art. The yarn of the invention has the following properties: the yarn length per defect is greater than or equal to about 3000 meters per defect; the maximum skip length is less than or equal to about 120 millimeters; the ratio between yarn length per defect to maximum skip length is greater than or equal to about 50; the entanglements per meter times the average entanglement strength is greater than or equal to about 120; and the yarn can be woven sizeless.

The present invention is advantageous because it eliminates the need for sizing before the yarn is woven, thus reducing manufacturing costs and eliminating removed-sizing disposal costs.

Other advantages of the present invention will be apparent from the following description, attached drawings, and attached claims.

DETAILED DESCRIPTION OF THE PREFERRED EMBODIMENTS

Figure 1:
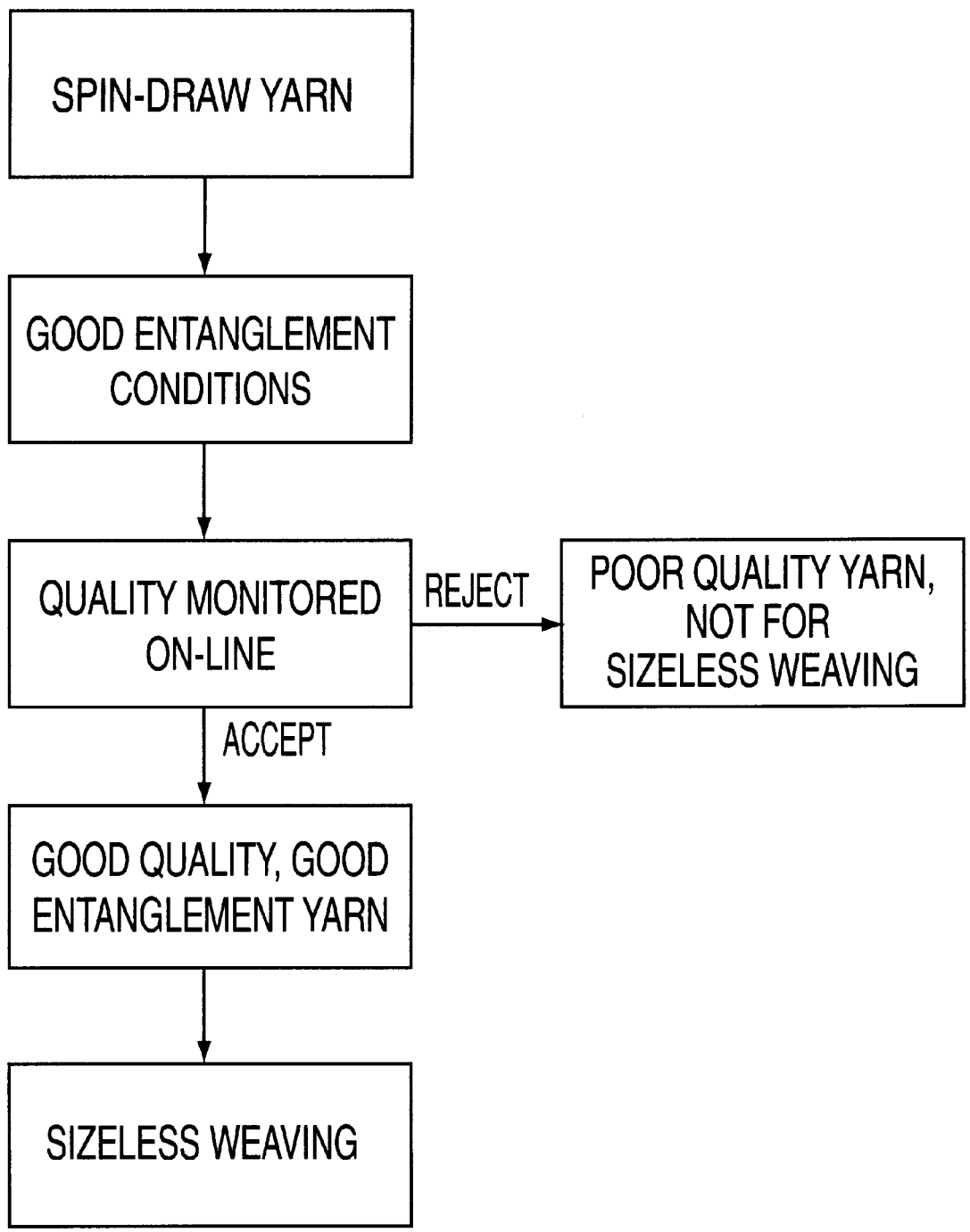
FIG. 1 is a block diagram of the method of achieving the sizeless yarn of the invention.

The term "yarn quality" as used herein is defined as the yarn length per number of defects, as measured using an Enka Technica Fraytec II. Yarn quality is measured on-line and continuously, that is, on the yarn manufacturing line on all yarn produced, to maintain a consistent yarn quality. A defect is a broken filament or a loop. A yarn quality of greater than or equal to about 3000 meters of yarn per defect (m/defect) is preferred, more preferred is yarn quality greater than or equal to about 4000 m/defect, still more preferred is yarn quality greater than or equal to about 4500 m/defect and the most preferred yarn quality is greater than or equal to about 5000 m/defect.

The term "maximum skip length" as used herein refers to the maximum unentangled length of yarn measured over a 10 meter length. It is measured in millimeters (mm).

The term "yarn package" denotes the continuous multifilament yarn after the yarn has been subjected to air entangling but prior to being converted into beam yarn for the weaving process.

The term "entanglement" as used herein refers to a section of yarn wherein the individual filaments are entangled together.

The term "entanglements per meter" (EPM) as used herein refers to the average number of entanglements per meter of yarn length, measured over a length of 10 meters of yarn.

The term "average entanglement strength" as used herein refers to the area under the curve for entanglement peaks as measured in a Reutlinger Interlace Counter Model RIC II, measured and averaged over a 10 meter length of yarn. This term is synonymous with the term "average entanglement area".

The term "sizeless" as used herein means a yarn which can be woven in the absence of a coating of a substance (e.g. polyacrylic acid, polyvinyl alcohol, polystyrene, polyacetates, wax, oil, gelatin, starch, etc.). "Sizeless" does not preclude use of customary spin or fiber finishes, nor coatings applied subsequent to weaving. The yarn of this invention provides acceptable sizeless weaving performance to the weaver.

The fiber-forming polymer used for the yarn of the invention can be any synthetic polymer including polyamides, polyesters, and polyolefins. Preferred polyamides are nylon 6 and nylon 66, with nylon 6 being especially preferred. Other polyamides include: nylon 11, nylon 12, nylon 6,10, nylon 6,12, nylon 4,6, copolymers thereof, and mixtures thereof. Polyesters include the homopolymers such as: polyethylene terephthalate; polytrimethylene terephthalate; polybutylene terephthalate; polyisobutylene terephthalate; poly(2,2-dimethylpropylene terephthalate); poly[bis-(hydroxymethyl)cyclohexene terephthalate]; polyethylene naphthalate; polybutylene naphthalate; poly[bis-(hydroxymethyl)cyclohexene naphthalate]; other polyalkylene or polycycloalkylene naphthalates and the mixed polyesters which, in addition to the ethylene terephthalate unit, contain component such as ethylene isophthalate; ethylene adipate; ethylene sebacate; 1,4-cyclohexylene dimethylene terephthalate; or other long chain alkylene terephthalate units, and copolymers thereof. Polyolefins include: polypropylene and polyethylene.

The inventive yarn is one which can be woven sizeless. As shown in FIG. 1, the process of making the inventive sizeless yarn involves: spin-drawing a multifilament yarn, subjecting it to good entanglement conditions, monitoring the yarn quality of the yarn on-line and sorting the yarn packages according to yarn quality to generate the inventive yarn having both good entanglement and consistent good yarn quality which can be woven sizeless, and a secondary yarn lacking in yarn quality which precludes it from sizeless weaving.

Sizeless yarn is achieved in part by introducing good entanglement into the yarn. Good entanglement is comprised of meeting or exceeding a minimum number of entanglements per meter, by meeting or exceeding a minimum average strength of those entanglements, and by meeting or exceeding a minimum value for the quantity calculated by multiplying the entanglements per meter by the average minimum strength of those entanglements.

The entanglement data used in describing the inventive yarn is generated from a commercially-available entangling measuring instrument, namely, a Reutlinger Interlace Counter Model RIC II. The Reutlinger Interlace Counter enables a more detailed analysis of entangled yarn characteristics than the Rothschild pin drop method described, for example, in U.S. Pat. No. 3,566,683.

When a yarn is conveyed through the Reutlinger unit it passes near a spring gauge. In general, a yarn is sent through the Reutlinger unit for 60 seconds at a rate of meters/minute and a sampling rate of 30 readings/second. When an entanglement contacts the spring gauge it displaces the spring which produces a voltage output. The peaks of the curve represent entangled sections and the valleys represent unentangled sections. The data represented by such a computer generated curve can be utilized to determine many useful measurements of the entangled yarn, these measurements being described in more detail below.

The average entanglement strength is measured by averaging each area under the curve and above the threshold for each entanglement. Calculating the area under the curve for each entanglement is a straightforward mathematical exercise which uses a standard method of integration. First, a baseline and threshold level for the data collected for a 10 meter yarn length is calculated. The baseline is determined by sorting all the voltage values in ascending order and then averaging the lowest 30% of these values. The average number is the baseline. The threshold value depends on the denier of the yarn that is tested. For fine denier yarn, i.e., about 700 denier or below, the threshold value is calculated by multiplying the baseline by a factor of 1.3. If a peak of the curve is below the threshold line, it is not considered to constitute an entanglement for measurement purposes. In an entanglement peak having two or more data points above the threshold, the area between adjacent pairs of data points is calculated by multiplying the average height of the two data points by the distance separating the two data points. The average height of the two data points is determined by subtracting the threshold value from each data point value, then averaging the results. The distance separating two data points depends on the sampling rate of the Reutlinger device and the yarn speed through the device. For example, for a yarn speed of 10 m/min and a sampling rate of 30 readings/sec, the distance between adjacent data points is 5.55 mm. The sum of the areas (in square millimeters, sq mm) for adjacent data points is the approximation of the area under the curve for the entanglement peak. For an entanglement peak having only one data point above the threshold, the distance in the area calculation is assumed to be 1 mm for simplification and is multiplied by the difference between the data point and the threshold. The average entanglement strength is then calculated by summing the areas of the entanglement peaks over a 10 meter yarn length and dividing the sum by the number entanglements in the 10 meter yarn length.

The yarn of the invention will have a minimum average entanglement strength of about 4.5, more preferably about 7, and most preferably about 8.

Another characteristic of the yarn relates to the distribution of the entanglements. The distribution of the entanglements is also referred to in the art as the entanglement level. A common measure of this distribution is entanglements per meter (EPM), which measures the average number of entanglements per meter of yarn length. The yarn of the invention has an EPM of about 15 to 50 EPM, preferably about 25 to 50 EPM, more preferably about 28 to 50 EPM, prior to being subjected to tension. If the EPM is below this minimum level, there will be an insufficient number of entanglements to provide the entanglement strength necessary to achieve the improved weaving performance of the yarn.

The product of the entanglements per meter and the average entanglement strength relates to the degree of overall yarn cohesiveness. If a yarn has a higher EPM, then the average strength of entanglement could be less and the yarn would still have sufficient overall strength and cohesiveness for the invention. The preferred value for the product is greater than or equal to about 120.

EPM does not measure the uniformity of the entanglement distribution. That is to say, EPM only provides the number of entanglements per meter without specifying how they are spaced within that meter. Accordingly, the uniformity of the entanglement distribution must be measured by other objective parameters such as the maximum skip length.

The maximum skip length is the maximum unentangled length of yarn over a 10 meter length. The longer the maximum skip length the more likely it is that the filaments will spread and cause a defect in the fabric. The yarn of the invention has a maximum skip length of less than about 120 mm, preferably less than 100 mm, more preferably less than 80 mm, and most preferably less than about 60 mm, prior to being subjected to tension. There is not a maximum skip length above which the yarn must be and, in fact, it is desirable to achieve as low a maximum skip length as possible.

Another important measure of entanglement is the strength COV. The strength COV indicates the uniformity of the entanglement strength. That is to say, it represents the degree to which the entanglement strength of each entanglement varies. Determining a coefficient of variance for a given data set is a well known statistical analytical calculation. In this instance, the strength COV is the average area between the computer generated curve and the baseline divided by the standard deviation of this area, the data for the curve being obtained over a 10 meter yarn length.

The inventive yarn has a strength COV of less than about 1.00. If the strength COV is above these limits, the entanglement strength of the individual entanglements is insufficiently uniform.

The maximum skip length COV is an important measure of the consistency of the uniformity of maximum unentangled length among packages. Determining a coefficient of variance for a given data set is a well known statistical analytical calculation. The maximum skip length COV is the average of maximum skip length for several packages of yarn divided by the standard deviation of the average maximum skip length. The data for calculating the average maximum skip length is obtained from about 4 to 8 packages of yarn. The inventive yarn has a maximum skip length COV of less than or equal to about 0.29, preferably less than or equal to about 0.27.

Good entanglement can be achieved by following the teachings of commonly-assigned U.S. Pat. No. 5,434,003, which is hereby incorporated to the extent necessary to complete teachings herein. As taught in U.S. Pat. No. 5,434,003, good entanglement is obtained by adjusting the pressure of the air striking the yarn bundle, the tension of the yarn bundle as it passes through the air jet and the air jet dimensions depending upon the number of filaments in the yarn bundle, the desired denier of the entangled yarn and the desired level of entanglement strength for the entangled yarn. In each instance, the above-identified processing parameters are adjusted so that the air pressure is sufficient to separate the incoming yarn bundle and generate the vortex and resonance necessary to entangle the filaments.

The entangling of the yarn takes place in an air jet. The air jet used can have a conventional construction in that it includes a yarn chamber or bore through which the filaments pass and are subjected to a gaseous stream, at least one opening for the filaments to enter into the yarn chamber, at least one opening for the resulting entangled yarn to exit the yarn chamber, and at least one air orifice which directs the air or gas into the yarn chamber. Air is the preferred gaseous steam; other possibilities include steam. Useful air jets are commercially available. There is not a limit on the number of air orifices per yarn end in the air jet, but a single, double or triple orifice air jet is preferred. The air jets also can be arranged in tandem. That is, there can be more than one air jet for each yarn end. The air jet bore or chamber can be any shape such as oval, round, rectangular, half-rectangular, triangular, half-moon, or like parallel plates. The air stream can strike the filaments at any angle, but an approximate right angle is preferred.

When a half-moon, oval or round-shaped bore is used the orifice diameter/bore diameter ratio should be greater than 0.375, preferably at least about 0.400, more preferably at least about 0.475, and most preferably at least about 0.500. In the case of an oval-shaped bore, the bore diameter is measured at its widest distance.

The air or gas passing through the orifice and striking the filaments must be of sufficient pressure to achieve the degree of entanglement desired without causing any damage to the filaments, such as a rip or tear. The air pressure used to produce the yarn of the present invention should range from about 20 to about 150 psi, preferably from about 40 to about 100 psi. If the air pressure is below these ranges, the degree of entanglement and the entanglement strength will be below that required. If the air pressure is above these ranges, the filaments become damaged and/or the entanglements become non-uniform in strength. Moreover, the cost of supplying air or gas under pressure begins to rise dramatically as the pressure requirements are increased.

The air entangling takes place after the formation of the individual polymeric filaments and before the winding of the yarn. The individual polymeric filaments may be formed by processes known in the art and can include any additives and/or finishes conventionally found with polymeric filaments. Illustrative of these processes are draw twisting, draw winding, spin drawing and warp drawing. Typically, at the final stage of formation the filaments are extruded from a spinneret and converged to form a yarn, a finish is applied, and the yarn is subjected to drawing and relaxing as necessary to achieve the desired final yarn mechanical properties. The drawn yarn is then led through the air jet for entanglement and through an on-line quality monitoring device prior to winding of the yarn. The filaments may be transported through the air jet by any of the conventional methods including the use of feed and withdrawal rolls.

The preferred method for nylon 6 yarn formation is a spin-draw process. The nylon 6 polymer is melted and extruded through the spinneret to form filaments at about 2700° C. to 290° C. After the spinneret, the filaments converge and finish is applied to the converged filaments prior to drawing. After finish application, the yarn is wound on a first roll, rotating at about 400 to 800 m/min and at a temperature between about room temperature and 90° C. The first roll feeds the yarn to the first of two draw zones, followed by the second draw zone and then a relaxation zone. The godet rolls in the drawing zones and the relaxation zone rotate at about 2000 to 4000 m/min, and are heated between about 150° C. and 220° C. The yarn is conducted through the air jet for entanglement, then through the Fraytec II on-line quality monitoring device before being wound up, at winder operating speeds of about 2000 to 4000 m/min.

Preferably, the total denier of the entangled yarn should be less than about 700. The more preferred total denier of the yarn ranges from about 630 denier to about 100 denier and includes a most preferred 420 denier yarn.

Good entanglement alone, however, does not result in a yarn which can be woven sizeless. For instance, a yarn produced in accordance with U.S. Pat. No. 5,657,798 to produce good entanglement could not be woven sizeless.

A key component to the invention is maintaining consistent yarn quality for each and every package of yarn included on a beam for sizeless weaving. This is achieved by utilizing an on-line quality monitoring device, preferably an Enka Technica Fraytec II, to measure the number of defects of every package of yarn produced, and segregating only those packages which meet or exceed the minimum yarn length per defect limitation to achieve yarn which may be woven sizeless. The on-line quality monitoring device is located after the entangling jet and before the winder. Other quality measuring devices can be employed with the relationship between Fraytec yarn quality values determined empirically to enable one to segregate appropriately to achieve the sizeless yarn of the invention. The key features are that the quality monitoring device be located on-line and that yarn packages not meeting the quality limitation are excluded from the sizeless yarn packages. Packages which do not meet the minimum yarn length per defect limitation may readily be woven with sizing.

The ratio between the yarn length per defect to the maximum skip length is a measure of yarn uniformity with respect to both entanglement properties and the yarn quality. The ratio between the yarn length per defect to the maximum skip length for a package of yarn is greater than or equal to 50, preferably greater than or equal to 70, and more preferably greater than of equal to 80.

Another measure of yarn uniformity with respect to both entanglement properties and the yarn quality is the ratio of length per defect to the maximum skip length COV. Since the maximum skip length COV is calculated using an average of 4 to 8 packages, each package used in the average should fulfill the limitations of this ratio. The preferred value for this ratio is equal to or greater than about 15,000, preferably equal to or greater than about 20,000.

The yarn of the invention can be woven sizeless under normal weaving conditions using loom types such as a Rapier loom, an air jet loom or a water jet loom. It can also be used in knitting and braiding applications.

EXAMPLES

Comparative Example A

A 630 denier, 136 filament nylon 6 yarn was made and the entanglement of the yarn was measured in accordance with U.S. Pat. No. 5,657,798 using a Rothschild pin drop EPM tester. The K1, K2 and K3 values were calculated as described in the patent. As set forth in Table 1, the yarn Comparative Example A fulfilled the entanglement limitations of the invention in U.S. Pat. No. 5, 657,798. Comparative Example A could not be woven sizeless.

TABLE I

| Example | K1 | K2 | K3 |
| --- | --- | --- | --- |
| Comp. Ex. A | 0.699 | 0.690 | 1039 |

Inventive Examples 1–8 and Comparative Example B

The 630 denier, 136 filament nylon 6 yarns of this example were individual packages from the same position of the same spin-draw panel and were subjected to exactly the same entanglement conditions using a PS-1600 parallel plate jet and air pressure within the preferred range and a yarn speed from 2000 to 4000 m/min. The yarn quality was monitored on-line using an Enka Technica Fraytec II device. This data is representative of a production of approximately 500 packages of yarn under the same entanglement conditions on two separate spin-draw panels run under identical processing conditions. About 12% of those packages did not meet the yarn quality limitation and were segregated away from the packages which met or exceeded the yarn quality limitation.

TABLE II

| Example | Yarn quality (m/defect) |
| --- | --- |
| Inv. Ex. 1 | 20,760 |
| Inv. Ex. 2 | 13,840 |
| Inv. Ex. 3 | 5931 |
| Comp. Ex. B | 3774 |
| Inv. Ex. 4 | 5190 |
| Inv. Ex. 5 | 6920 |
| Inv. Ex. 6 | 8304 |
| Inv. Ex. 7 | 13,840 |
| Inv. Ex. 8 | 5931 |

The entanglement conditions used resulted in consistently good entanglement in the resulting packages, however, as these data show, yarn quality varied. These data therefore indicate that good entanglement does not guarantee high yarn quality and that yarn quality is independent of entanglement. These data also demonstrate why an on-line quality measuring device is essential for determining and maintaining the minimum yarn quality necessary for sizeless yarn by yarn segregation according to this invention. The eight inventive examples which met or exceeded the yarn quality limitation were woven sizeless.

Inventive Examples 9–12

Inventive Examples 9 through 12 were 630 denier nylon 6 yarns with 136 filaments, and were entangled using a PS-1600 parallel plate jet having an air pressure within the preferred range. The entanglement data was measured as described using the Reutlinger Interlace Counter Model RIC II. The yarn quality was measured on-line using an Enka Technica Fraytec II.

TABLE III

| Example | Inventive Ex. 9 | Inventive Ex. 10 | Inventive Ex. 11 | Inventive Ex. 12 |
|---|---|---|---|---|
| Maximum skip length (mm) | 33.33 | 55.56 | 66.67 | 61.11 |
| EPM | 31 | 29 | 26 | 26 |
| Average entanglement strength | 8.60 | 8.95 | 8.69 | 9.68 |
| Average entanglement strength COV | 0.67 | 0.54 | 0.57 | 0.50 |
| EPM × average entanglement strength | 266.6 | 259.6 | 225.9 | 251.7 |

The average maximum skip length calculated for these four inventive yarn packages was 54.17, the standard deviation was 14.61 and the maximum skip length COV was 0.27. Inventive Examples 9 through 12 each had a yarn quality of 5000 m/defect or greater. These four Inventive Examples were woven sizeless.

In addition, a 420 denier nylon 6 yarn with similar properties as Inventive Examples 9 through 10 was also made and was woven sizeless.

Inventive Example 13 and Comparative Examples C, D, and E

Four yarns were generated to test four possible combinations of entanglement and yarn quality. The four yarns were then all tested for sizeless weaving in a 40.5×40.5 construction. The results of this weaving trial are shown in Table IV.

TABLE IV

| Example | Entanglement | Yarn quality | Sizeless Weaving Result |
|---|---|---|---|
| Comp. Ex. C | Bad | Bad | cannot be woven |
| Comp. Ex. D | Good | Bad | weavable but not acceptable levels of fabric quality and loom efficiency |
| Comp. Ex. E | Bad | Good | weavable but not acceptable levels of fabric quality and loom efficiency |
| Inv. Ex. 13 | Good | Good | can be woven |

These data demonstrate that both good quality and good entanglement are necessary for achieving sizeless weaving. Good quality is essential to reduced/eliminate occurrences of the problems which prevent sizeless weaving at a reasonable efficiency and picks per inch.

What is claimed is:

1. A method to make a yarn comprising the steps of:

(a) extruding polymer to produce filaments;

(b) converging said filaments into a yarn;

(c) introducing entanglements into said filaments;

(d) using an on-line device to monitor defects in all said yarn produced; and (e) segregating said yarn which has a sufficient yarn quality for sizeless weaving wherein said yarn has the following properties:

the yarn length per defect is greater than or equal to about 3000 meters per defect;

the maximum skip length is less than or equal to about 120 millimeters;

the ratio between said yarn length per defect to said maximum skip length is greater than or equal to about 50;

the entanglements per meter times the average entanglement strength is greater than or equal to about 120; and can be woven sizeless.

2. The process of claim 1 wherein said polymer is polyamide.

3. The process of claim 2 wherein said polymer is nylon 6,6.

4. The process of claim 2 wherein said polymer is nylon 6.

5. The process of claim 1 wherein in said step (c), an air jet is used.

* * * * *